(12) United States Patent
Tanaka

(10) Patent No.: US 10,770,097 B2
(45) Date of Patent: Sep. 8, 2020

(54) ELEMENT HEATER WITH BACK PLANE REFLECTORS

(71) Applicant: Seagate Technology LLC, Cupertino, CA (US)

(72) Inventor: Samuel Lewis Tanaka, San Leandro, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 339 days.

(21) Appl. No.: 15/853,213

(22) Filed: Dec. 22, 2017

(65) Prior Publication Data
US 2019/0198045 A1    Jun. 27, 2019

(51) Int. Cl.
| | | |
|---|---|---|
| G11B 5/127 | (2006.01) | |
| H05B 3/03 | (2006.01) | |
| H05B 3/84 | (2006.01) | |
| H05B 3/26 | (2006.01) | |
| G11B 5/84 | (2006.01) | |
| G11B 5/00 | (2006.01) | |

(52) U.S. Cl.
CPC .............. *G11B 5/127* (2013.01); *G11B 5/84* (2013.01); *H05B 3/03* (2013.01); *H05B 3/26* (2013.01); *H05B 3/84* (2013.01); *G11B 2005/0021* (2013.01)

(58) Field of Classification Search
CPC ... G11B 5/127; G11B 5/84; G11B 2005/0021; H05B 33/03; H05B 33/26; H05B 33/84; H05B 33/93
USPC ....... 219/219, 200, 538, 552, 553, 520, 536, 219/537
See application file for complete search history.

(56) References Cited

U.S. PATENT DOCUMENTS

| | | | | |
|---|---|---|---|---|
| 3,619,466 | A * | 11/1971 | Athanis | H05B 3/0014 373/111 |
| 4,686,678 | A * | 8/1987 | Ohta | G02B 6/4208 257/680 |
| 5,001,719 | A * | 3/1991 | Trussell | H01S 5/42 372/43.01 |
| 5,420,612 | A * | 5/1995 | Brock | B41J 2/395 347/201 |
| 6,246,029 | B1 * | 6/2001 | Addis | C30B 11/003 134/1 |
| 6,435,868 | B2 | 8/2002 | White et al. | |
| 7,279,718 | B2 * | 10/2007 | Krames | H01L 33/08 257/98 |
| 8,701,753 | B2 | 4/2014 | Yi et al. | |
| 8,727,567 | B1 * | 5/2014 | Tien | H01L 25/0753 362/235 |
| 8,809,743 | B2 * | 8/2014 | Suzuki | G01K 13/00 156/179 |
| 2004/0264195 | A1 * | 12/2004 | Chang | H01L 33/642 362/294 |
| 2007/0085101 | A1 * | 4/2007 | Kim | H01L 33/62 257/98 |
| 2010/0072499 | A1 * | 3/2010 | Kwon | H01L 33/483 257/98 |

(Continued)

Primary Examiner — Lien M Ngo
(74) Attorney, Agent, or Firm — Holzer Patel Drennan

(57) ABSTRACT

An apparatus includes an electrode and a heating element attached to the electrode. A heat sink is between the electrode and the heating element. A mirror is between the heat sink and the heating element. An aperture reflector surrounds the mirror and the heating element.

20 Claims, 4 Drawing Sheets

(56) References Cited

U.S. PATENT DOCUMENTS

| | | | |
|---|---|---|---|
| 2010/0108659 A1* | 5/2010 | Lehman | F24C 3/087 |
| | | | 219/400 |
| 2010/0164346 A1* | 7/2010 | Li | F21V 7/30 |
| | | | 313/46 |
| 2011/0317412 A1* | 12/2011 | Paik | F21V 29/83 |
| | | | 362/235 |
| 2014/0153263 A1* | 6/2014 | Palaniswamy | H01L 33/62 |
| | | | 362/382 |

\* cited by examiner

ELEMENT HEATER WITH BACK PLANE REFLECTORS

SUMMARY

Provided herein is an electrode and a heating element attached to the electrode. A heat sink is between the electrode and the heating element. A mirror is between the heat sink and the heating element. An aperture reflector surrounds the mirror and the heating element. These and other features and advantages will be apparent from a reading of the following detailed description.

DESCRIPTION

Figure 1:
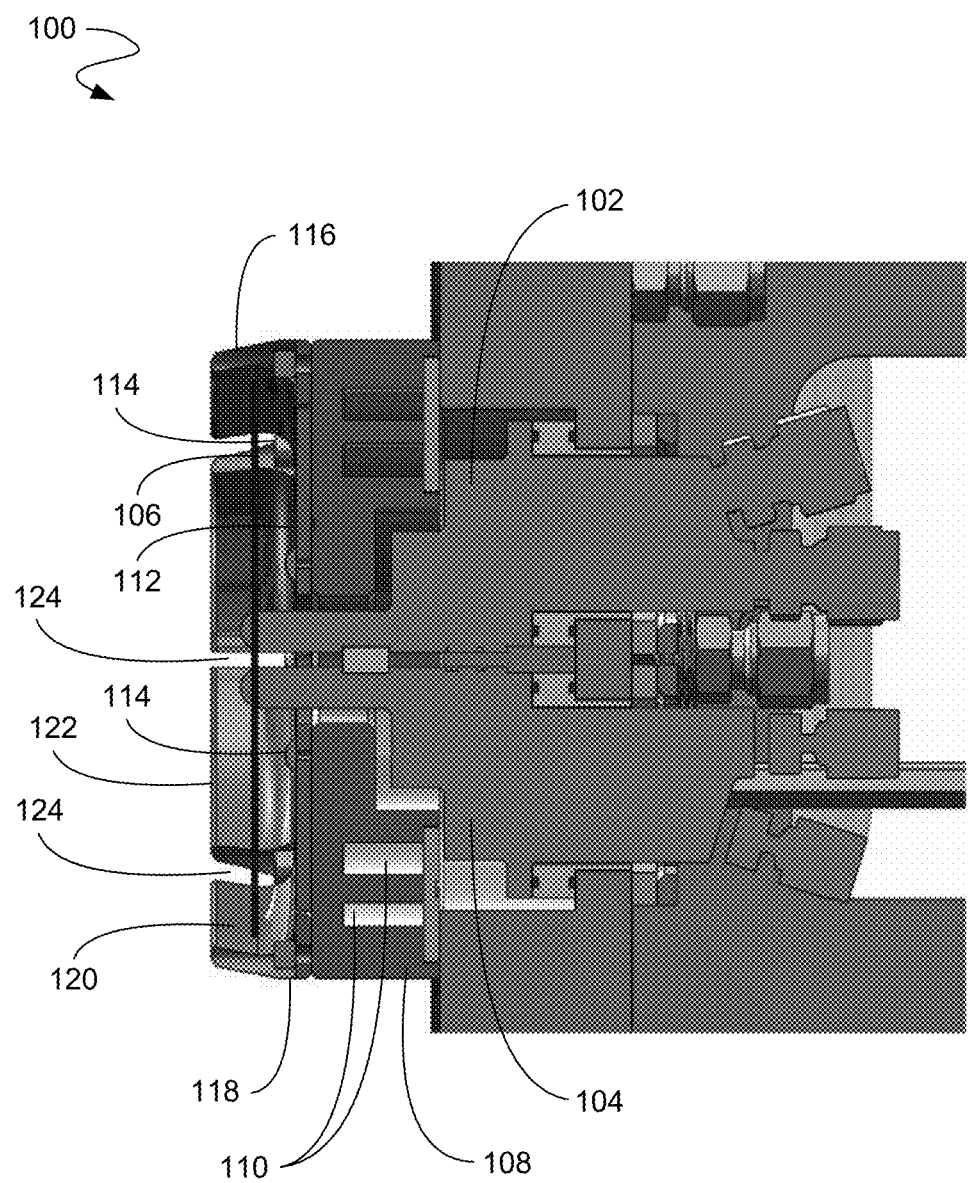
FIG. 1 shows a cross section of a heater according to one aspect of the present embodiments.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

A disk drive media manufacturing process may include a carrier that moves a workpiece between stations. As the workpiece moves through the stations on the carrier, the workpiece may move in and out of chambers in which a number of processes form various layers on the workpiece. Some non-limiting examples of the processes may include heating, sputtering, and cooling the workpiece.

When forming heat assisted magnetic recording (hereinafter, "HAMR") media, a workpiece may need to be heated prior to further processing. For example, a substrate may need to be quickly heated (e.g. within 5 seconds or less) on both sides to temperatures 400 degrees Celsius or more. Therefore, in various embodiments described herein the carrier moves a substrate into a position between two heaters. The heaters include elements to increase the efficiency and speed of the heating. For example, the heaters include elements that reflect and focus emissions from the heating elements towards the substrate. As a result, the substrate is heated very quickly on both sides. After the heating, the carrier moves the substrate to the next station for further processing (e.g. sputtering).

Referring now to FIG. 1, a cross section of a heater 100 is shown according to one aspect of the present embodiments. The heater 100 may include one or more electrodes (e.g. first electrode 102 and second electrode 104) physically and electrically attached to a heating element 106 (e.g. high temperature graphite element). In some embodiments, the electrodes 102, 104 cause the heating element 106 to heat to temperatures over 2000 degrees Celsius. Emissions from the heating element 106 travel in all directions.

In order to protect the heater 100, a heat sink 108 is positioned between the electrodes 102, 104 and the heating element 106. In various embodiments, the heat sink 108 may include one or more high flow water channels 110. For example, the high flow water channels 110 may be capable of flow rates of 10 liters per minute or greater. However, emissions from the heating element 106 that are removed by the heat sink 108 reduce efficiency of the heater 100. Therefore, embodiments described herein include elements for reflecting the emissions away from the heater 100 (e.g. away from the heat sink 108).

In order to increase the efficiency of the heater 100, various embodiments include a back plane mirror 112 mounted on the heat sink 108 and positioned between the heat sink 108 and the heating element 106. The back plane mirror 112 is a reflector that reflects emissions from the heating element 106 away from the heater 100 and the heat sink 108. As such, heat removed by the heat sink 108 is greatly reduced by the back plane mirror 112, thereby increasing the efficiency of the heater 100. In order to withstand the heat generated by the heating element 106, some embodiments use a heat resistant mirror (e.g. a molybdenum mirror). In addition, in order to improve efficiency some embodiments use a highly polished mirror, wherein a surface roughness of the mirror is 300 angstroms Ra (roughness average) or less.

In the illustrated embodiment, the back plane mirror 112 is annular and may include a diameter of 200 mm or less. However, it is understood that embodiments may include any size and shape back plane mirror 112. For example, the back plane mirror 112 may be a parabolic mirror. Furthermore, more than one back plane mirror may be mounted to the heat sink 108. For example, two half circle back plane mirrors may be combined to form a complete circle. Therefore, any number and shape of back plane mirrors may be simultaneously mounted.

The back plane mirror 112 may be removably secured to the heat sink 108 with fasteners 114 (e.g. screw, bolt, press fit rivet, tie, etc.). As such, various diameters of the back plane mirror 112 may be interchangeable for various heating requirements. For example, a 200 mm diameter back plane mirror may be replaced with a 100 mm diameter back plane mirror in order to meet a desired efficiency and/or substrate size. In addition, the back plane mirror 112 may be replaced with a newly polished back plane mirror. For example, the back plane mirror 112 may dull/tarnish and lose reflectivity as it is used over time. Therefore, the back plane mirror 112 may be replaced with a fresh back plane mirror in order to minimize downtime of the heater 100. The back plane mirror 112 may be repolished or discarded after removal. The fasteners 114 include materials to resist the high temperatures generated by the heating element 106. For example, in some embodiments the fasteners 114 may be molybdenum fasteners.

In various embodiments, the efficiency of the heater 100 is also increased with an aperture reflector 116 mounted on the heat sink 108. The aperture reflector 116 surrounds the back plane mirror 112 (e.g. the reflector) and the heating element 106. In some embodiments, the aperture reflector 116 is a cone shape that extends away from the heating element 106. As such, the aperture reflector 116 narrows as it extends further from the heating element 106. It is understood that the cone shape is non-limiting, and further embodiments may use any shape, including broadening (e.g. opposite of narrowing) shapes and continuous (e.g. neither narrowing nor broadening) shapes.

The aperture reflector 116 includes a base 118 surrounding the back plane mirror 112. As such, the diameter of the base 118 is larger than the back plane mirror 112. The aperture reflector 116 also includes a reflective sidewall 120 facing the heating element 106. The reflective sidewall 120 prevents emissions from escaping from the sides of the heating element 106, and focuses the emissions into a unified direction away from the heating element 106. As such wasted escaped heat is greatly reduced by the aperture reflector 116, thereby increasing the efficiency of the heater 100. In order to withstand the heat generated by the heating element 106, some embodiments use a heat resistant aperture reflector (e.g. a molybdenum aperture reflector). In addition, in order to improve efficiency some embodiments use a highly polished reflective sidewall, wherein a surface roughness of the reflective sidewall is 300 angstroms Ra (roughness average) or less.

In the illustrated embodiment, the reflective sidewall 120 extends away from the base 118 to an opening 122 (e.g. aperture) that is narrower than the back plane mirror 112. For example, the opening 122 may include a diameter less than 200 mm. As such, the opening 122 includes a smaller diameter than the diameter of the back plane mirror 112. As described above, it is understood that the aperture reflector 116 may be any shape, as well as broadening and continuous. Therefore, the sidewall 120 and the opening 122 may also be any shape, as well as broadening and continuous. As such, the opening 122 may include a diameter that is equal to or larger than the diameter of the back plane mirror 112. Furthermore, more than one aperture reflector may be mounted to the heat sink 108. For example, two half circle aperture reflectors may be combined to form a complete circle. Therefore, any number and shape of aperture reflectors may be simultaneously mounted.

The aperture reflector 116 may be removably secured to the heat sink 108 with the fasteners 114 (e.g. screw, bolt, press fit rivet, tie, etc.). As such, various diameters of the aperture reflector 116 may be interchangeable for various heating requirements. For example, an aperture reflector with a 95 mm opening may be replaced with an aperture reflector with a 150 mm or 50 mm opening in order to meet a desired efficiency and/or substrate size. It is understood that aperture reflectors with varying sized bases may also be interchangeably replaced. In addition, the aperture reflector 116 may be replaced with a newly polished aperture reflector. For example, the aperture reflector 116 may dull/tarnish and loose reflectivity as it is used over time. Therefore, the aperture reflector 116 may be replaced with a fresh aperture reflector in order to minimize downtime of the heater 100. The aperture reflector 116 may be repolished or discarded after removal.

In various embodiments, the aperture reflector 116 may also include gaps 124 that are perpendicular to the back plane mirror 112. Any number of the gaps 124 may be present. The gaps 124 may be positioned to facilitate access to the fasteners 114. In addition, the gaps 124 may be positioned to relieve stress caused by the expansion and/or contraction of the aperture reflector 116 during temperature changes.

Figure 2:
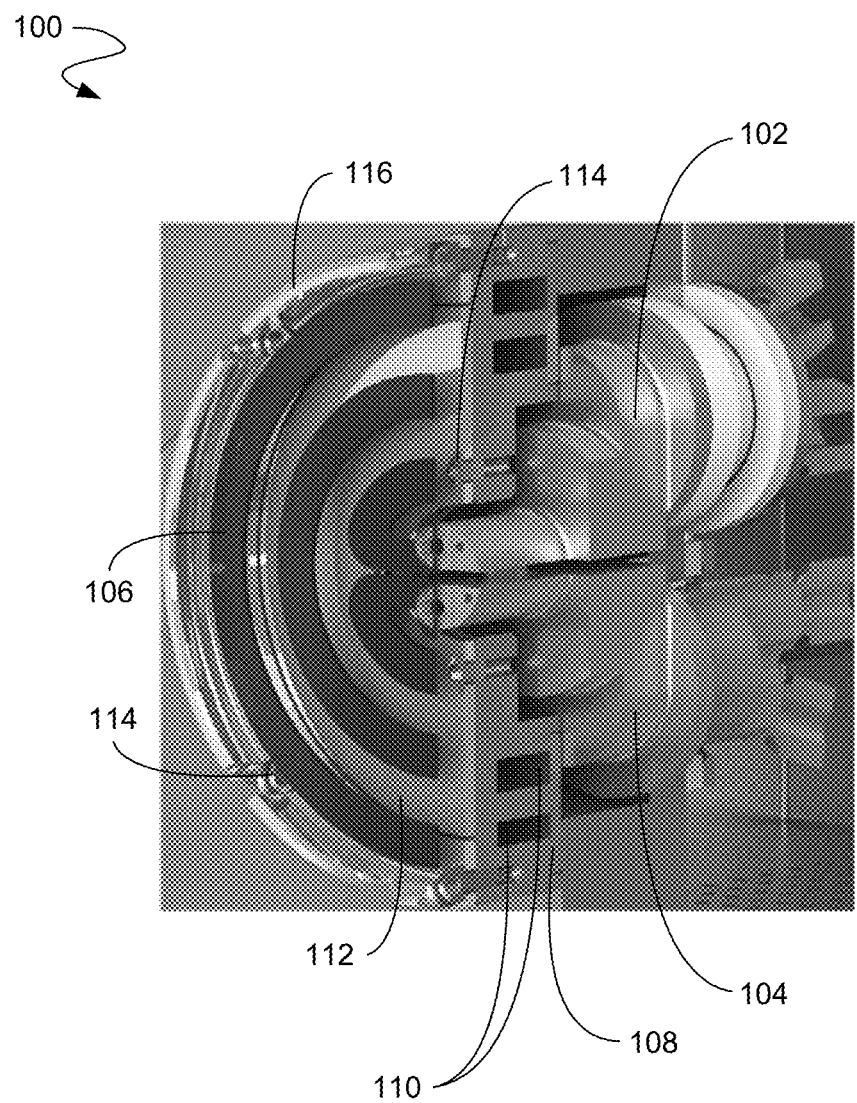
FIG. 2 shows a perspective cross section of the heater according to one aspect of the present embodiments.

Referring now to FIG. 2, a perspective cross section of the heater 100 is shown according to one aspect of the present embodiments. The first electrode 102 and the second electrode 104 are physically and electrically attached to the heating element 106. The heat sink 108 is positioned between the electrodes 102, 104 and the heating element 106. The heat sink 108 includes the high flow water channels 110. The back plane mirror 112 is mounted on the heat sink 108 and positioned between the heat sink 108 and the heating element 106. The back plane mirror 112 is removably secured to the heat sink 108 with the fasteners 114. The aperture reflector 116 is mounted on the heat sink 108, and surrounds the back plane mirror 112 and the heating element 106. The aperture reflector 116 is removably secured to the heat sink 108 with the fasteners 114. The heat sink 108, the back plane mirror 112, and the aperture reflector 116 are electrically isolated from the first electrode 102, the second electrode 104, and the heating element 106.

Figure 3A:
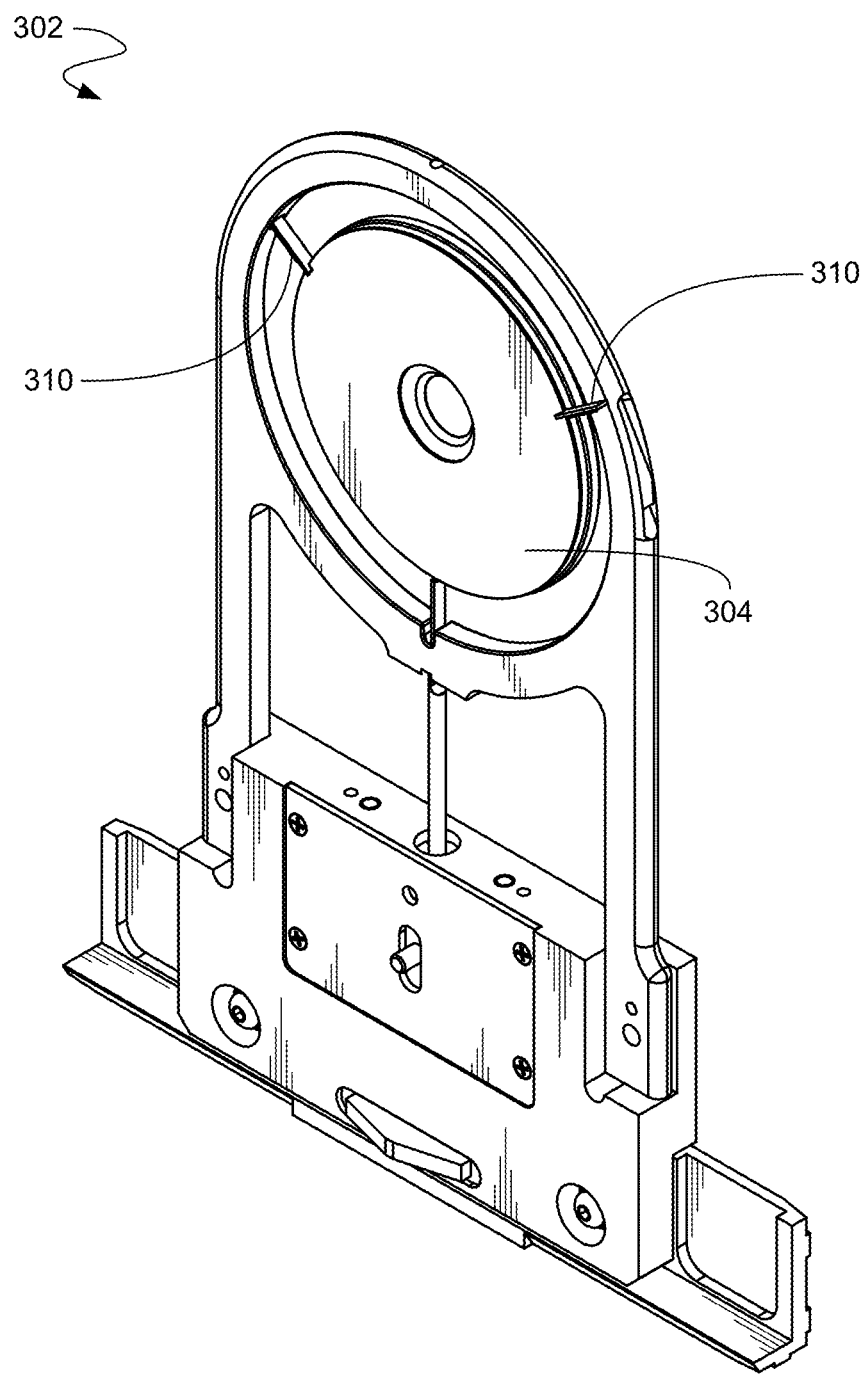
FIGS. 3A and 3B show a system including a carrier for positioning a workpiece between a first heater and a second heater according to one aspect of the present embodiments.
Figure 3B:
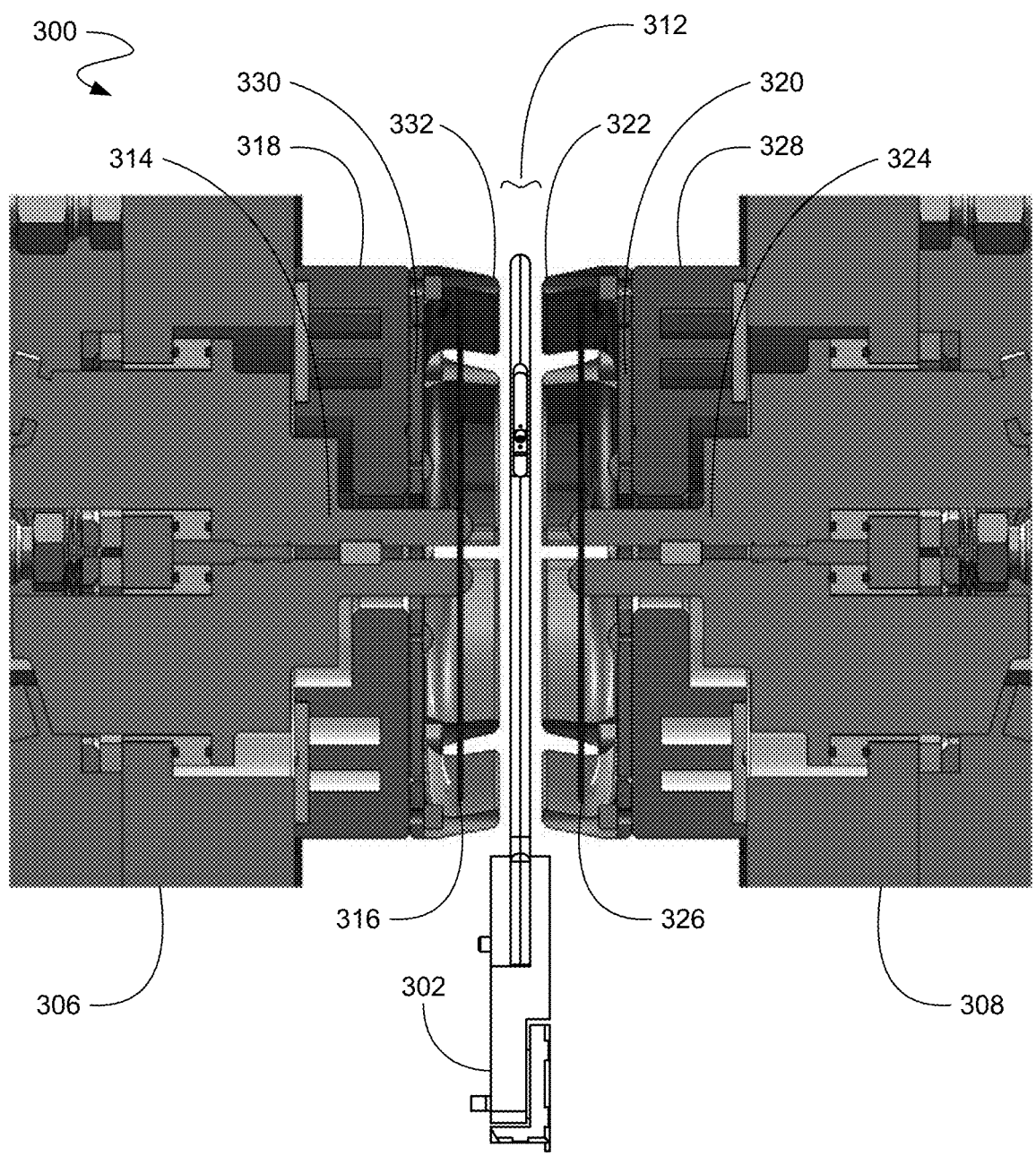

Referring now to FIGS. 3A and 3B, a system 300 including a carrier 302 for positioning a workpiece 304 between a first heater 306 and a second heater 308 is shown according to one aspect of the present embodiments. The carrier 302 secures the workpiece 304 (e.g. substrate) with securing devices 310 (e.g. clips). The carrier 302 is configured to move the workpiece 304 into a gap 312 between the first heater 306 and the second heater 308.

The first heater 306 and the second heater 308 include the elements previously discussed above. For example, the first heater 306 includes at least a first electrode 314, a first heating element 316, a first heat sink 318, a first back plane mirror 320, and a first aperture reflector 322. The second heater 308 includes at least a second electrode 324, a second heating element 326, a second heat sink 328, a second back plane mirror 330, and a second aperture reflector 332. It is understood that further components may also be present, but are not discussed for clarity of illustration.

The carrier 302 positions the workpiece 304 in the gap 312 such that the first aperture reflector 322 is positioned to direct heat from the first heating element 316 onto a first side of the workpiece 304. In addition, the second aperture reflector 332 is positioned to direct heat from the second heating element 326 onto a second side of the workpiece 304. Therefore, both sides of the workpiece 304 may be heated at the same time. After both sides of the workpiece 304 have reached a target temperature (e.g. 500 degrees Celsius or more) the carrier 302 moves the workpiece 304 out of the gap 312 and on to further processing.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A system comprising:
    a first heater including,
        a first electrode,
        a first heating element attached to the first electrode,
        a first heat sink between the first electrode and the first heating element;
        a first mirror between the first heat sink and the first heating element, and
        a first aperture reflector surrounding the first mirror and the first heating element;
    a second heater including,
        a second electrode,
        a second heating element attached to the second electrode,
        a second heat sink between the second electrode and the second heating element;
        a second mirror between the second heat sink and the second heating element, and
        a second aperture reflector surrounding the second mirror and the second heating element; and
    a carrier configured to move a workpiece in a gap between the first heater and the second heater, wherein
        the first aperture reflector is positioned to direct heat from the first heating element onto a first side of the workpiece, and
        the second aperture reflector is positioned to direct heat from the second heating element onto a second side of the workpiece.

2. The system of claim 1, further comprising a fastener removably securing the first mirror to the first heat sink.

3. The system of claim 1, further comprising a fastener removably securing the first aperture reflector to the first heat sink.

4. The system of claim 1, wherein the first aperture reflector is a cone shape extending away from the first heating element.

5. The system of claim 1, further comprising gaps in the first aperture reflector, wherein the gaps are perpendicular to the first mirror.

6. The system of claim 1, wherein the first aperture reflector includes a base surrounding the first mirror and a sidewall extending away from the base to an opening narrower than the first mirror.

7. The system of claim 1, wherein the first aperture reflector includes a reflective sidewall facing the first heating element.

8. An apparatus comprising:
    an electrode;
    a heating element attached to the electrode;
    a heat sink between the electrode and the heating element;
    a mirror between the heat sink and the heating element; and
    an aperture reflector surrounding the mirror and the heating element.

9. The apparatus of claim 8, wherein a diameter of the mirror is 200 mm or less.

10. The apparatus of claim 8, wherein a surface roughness of the mirror is 300 angstroms roughness average or less.

11. The apparatus of claim 8, wherein the mirror is a molybdenum mirror.

12. The apparatus of claim 8, wherein the aperture reflector is a molybdenum aperture reflector.

13. The apparatus of claim 8, further comprising molybdenum fasteners securing the mirror to the heat sink.

14. An apparatus comprising:
    a heat sink between an electrode and an element;
    a reflector mounted on the heat sink, wherein the reflector is positioned to reflect emissions from the element away from the heat sink; and
    an aperture reflector surrounding the reflector and the element, wherein the heat sink, the reflector, and the aperture reflector are electrically isolated from the electrode and the element.

15. The apparatus of claim 14, further comprising a fastener removably securing the reflector to the heat sink.

16. The apparatus of claim 14, further comprising a fastener removably securing the aperture reflector to the heat sink.

17. The apparatus of claim 14, wherein the aperture reflector is a cone shape extending away from the element.

18. The apparatus of claim 14, further comprising gaps in the aperture reflector, wherein the gaps are perpendicular to the reflector.

19. The apparatus of claim 14, wherein the aperture reflector includes a base surrounding the reflector and a sidewall extending away from the base to an opening narrower than the mirror.

20. The apparatus of claim 14, wherein the aperture reflector includes a reflective sidewall facing the heating element.

* * * * *